United States Patent
Steinbeck et al.

(10) Patent No.: US 10,860,579 B2
(45) Date of Patent: Dec. 8, 2020

(54) QUERY PLANNING AND EXECUTION WITH REUSABLE MEMORY STACK

(71) Applicant: SAP SE, Walldorf (DE)

(72) Inventors: Timm Steinbeck, Neckargemuend (DE); Moritz Thomas, Sandhausen (DE)

(73) Assignee: SAP SE, Walldorf (DE)

(*) Notice: Subject to any disclaimer, the term of this patent is extended or adjusted under 35 U.S.C. 154(b) by 575 days.

(21) Appl. No.: 15/419,056

(22) Filed: Jan. 30, 2017

(65) Prior Publication Data
US 2018/0218039 A1 Aug. 2, 2018

(51) Int. Cl.
*G06F 16/2453* (2019.01)

(52) U.S. Cl.
CPC .. *G06F 16/24542* (2019.01); *G06F 16/24539* (2019.01)

(58) Field of Classification Search
None
See application file for complete search history.

(56) References Cited

U.S. PATENT DOCUMENTS

| | | | |
|---|---|---|---|
| 5,918,225 A | 6/1999 | White et al. | |
| 6,374,236 B1 | 4/2002 | Chen et al. | |
| 7,174,553 B1 | 2/2007 | Reed et al. | |
| 7,337,174 B1 | 2/2008 | Craig | |
| 7,797,342 B2 | 9/2010 | Banks et al. | |
| 7,805,456 B2 * | 9/2010 | Meijer | G06F 16/2438 |
| | | | 707/759 |
| 8,255,388 B1 * | 8/2012 | Luo | G06F 16/217 |
| | | | 707/719 |
| 8,977,600 B2 | 3/2015 | Crupi et al. | |
| 9,165,021 B2 | 10/2015 | Bhattacharjee et al. | |
| 9,298,768 B2 | 3/2016 | Varakin et al. | |

(Continued)

FOREIGN PATENT DOCUMENTS

EP 2930629 10/2015

OTHER PUBLICATIONS

Neumann, Thomas. "Efficiently compiling efficient query plans for modern hardware." Proceedings of the VLDB Endowment 4.9 (2011): 539-550.

(Continued)

*Primary Examiner* — Christopher J Raab
(74) *Attorney, Agent, or Firm* — Mintz Levin Cohn Ferris Glovsky and Popeo, P.C.

(57) ABSTRACT

A system for query planning and execution with reusable memory stack(s) is provided. In some implementations, the system performs operations comprising providing a first space in memory for storing first results of a first operator of a query, the first space located within a portion of a heap memory. The operations can further comprise generating at least a portion of the first results based on executing the first operator, providing a descriptor comprising information regarding the first space to a second operator which occurs after the first operator in a query plan, providing a second space in the previously allocated portion for storing second results of the second operator, and/or generating at least a portion of the second results based on executing the second operator using the first space. Related systems, methods, and articles of manufacture are also described.

20 Claims, 7 Drawing Sheets

(56) References Cited

U.S. PATENT DOCUMENTS

| | | | |
|---|---|---|---|
| 9,495,207 | B1 | 11/2016 | Pjesivac-Grbovic et al. |
| 10,152,511 | B2 | 12/2018 | Rajan |
| 10,423,619 | B2 * | 9/2019 | Merker ............ G06F 16/24542 |
| 2001/0037322 | A1 | 11/2001 | Lindsay et al. |
| 2002/0035559 | A1 | 3/2002 | Crowe et al. |
| 2003/0212668 | A1 * | 11/2003 | Hinshaw ............ G06F 16/2471 |
| 2004/0015511 | A1 | 1/2004 | Seefeldt et al. |
| 2004/0078364 | A1 | 4/2004 | Ripley et al. |
| 2004/0162822 | A1 | 8/2004 | Papanyan et al. |
| 2004/0230559 | A1 | 11/2004 | Newman et al. |
| 2005/0028134 | A1 | 2/2005 | Zane et al. |
| 2005/0080755 | A1 | 4/2005 | Aoyama |
| 2005/0138000 | A1 | 6/2005 | Roux et al. |
| 2007/0239797 | A1 | 10/2007 | Catell |
| 2007/0250470 | A1 | 10/2007 | Duffy et al. |
| 2008/0033960 | A1 | 2/2008 | Banks et al. |
| 2008/0098053 | A1 | 4/2008 | Miao et al. |
| 2008/0281786 | A1 | 11/2008 | Duffy et al. |
| 2008/0281846 | A1 | 11/2008 | Hoang et al. |
| 2009/0006429 | A1 | 1/2009 | Champion et al. |
| 2009/0030874 | A1 | 1/2009 | Das et al. |
| 2009/0228434 | A1 | 9/2009 | Krishnamurthy et al. |
| 2010/0114973 | A1 | 5/2010 | Goyal |
| 2010/0131550 | A1 | 5/2010 | Nakadai |
| 2010/0262633 | A1 | 10/2010 | Bhattacharjee et al. |
| 2010/0281017 | A1 | 11/2010 | Hu et al. |
| 2011/0066668 | A1 | 3/2011 | Guarraci |
| 2011/0072006 | A1 * | 3/2011 | Yu ....................... G06F 16/2471<br>707/718 |
| 2012/0059839 | A1 * | 3/2012 | Andrade ............... G06F 16/252<br>707/760 |
| 2012/0084315 | A1 | 4/2012 | Schneider et al. |
| 2013/0054630 | A1 | 2/2013 | Briggs et al. |
| 2013/0073573 | A1 * | 3/2013 | Huang ................ G06F 16/254<br>707/755 |
| 2013/0151502 | A1 | 6/2013 | Yoon et al. |
| 2013/0226903 | A1 * | 8/2013 | Wu .................... G06F 16/24542<br>707/719 |
| 2014/0081950 | A1 | 3/2014 | Rajan |
| 2014/0089294 | A1 | 3/2014 | Shankar et al. |
| 2014/0108861 | A1 | 4/2014 | Abadi et al. |
| 2014/0156632 | A1 * | 6/2014 | Yu ....................... G06F 16/2471<br>707/713 |
| 2014/0172914 | A1 * | 6/2014 | Elnikety ............ G06F 16/9024<br>707/774 |
| 2014/0280030 | A1 | 9/2014 | Freedman et al. |
| 2014/0280037 | A1 | 9/2014 | Petride et al. |
| 2014/0351233 | A1 | 11/2014 | Crupi et al. |
| 2015/0026154 | A1 | 1/2015 | Jeong et al. |
| 2015/0178305 | A1 | 6/2015 | Mueller et al. |
| 2015/0186461 | A1 | 7/2015 | Nica |
| 2015/0193500 | A1 | 7/2015 | Aute et al. |
| 2015/0261820 | A1 * | 9/2015 | Cheng ............... G06F 16/24544<br>707/718 |
| 2015/0269224 | A1 * | 9/2015 | Kundu ................ G06F 16/2455<br>707/718 |
| 2015/0269228 | A1 | 9/2015 | Fisher et al. |
| 2016/0055348 | A1 | 2/2016 | Lewak |
| 2016/0098448 | A1 * | 4/2016 | McShane ............ G06F 17/2705<br>707/713 |
| 2017/0024433 | A1 | 1/2017 | Neelakanthappa et al. |
| 2017/0228425 | A1 | 8/2017 | Kandula et al. |
| 2017/0262516 | A1 | 9/2017 | Horowitz et al. |
| 2017/0308547 | A1 | 10/2017 | Willems |
| 2018/0150513 | A1 * | 5/2018 | Willems ............. G06F 16/2455 |
| 2018/0150514 | A1 * | 5/2018 | Willems ............ G06F 16/24542 |
| 2018/0150515 | A1 * | 5/2018 | Merker ................ G06F 16/252 |

OTHER PUBLICATIONS

Neumann, Efficienttly compiling efficient query plans for modern hardware, Proceedings of the VLDB endowment, 2011, pp. 539-550.

* cited by examiner

US 10,860,579 B2

QUERY PLANNING AND EXECUTION WITH REUSABLE MEMORY STACK

TECHNICAL FIELD

The subject matter described herein relates to database management, and more particularly, query planning and execution with reusable memory stack(s).

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time. Given the complexity of these queries and/or their volume, the underlying databases face challenges in order to optimize performance.

SUMMARY

In some aspects, a method, computer program product and system are provided. In an implementation, a database execution engine is provided. The database execution engine can include (or otherwise utilize) a processor and/or memory, which can be configured to perform operations including providing a first space in memory for storing first results of a first operator of a query, wherein the first space is located within a previously allocated portion of a heap memory, and wherein the first space is allocated based on a number of columns required to store at least one row of the first results. The operations can further include generating at least a portion of the first results based on executing the first operator and providing a descriptor comprising information regarding the first space to a second operator, which occurs after the first operator in a query plan. The operations can further include providing a second space in the previously allocated portion for storing second results of the second operator and generating at least a portion of the second results based on executing the second operator using the first space.

In some variations, the descriptor comprises one or more of an indication of a starting location of the first space, an indication of an ending location of the first space, a number of columns within the first space, a data type associated with each of the columns in the space, and/or a number of rows within the space. In some variations, the operations can further include allocating the previously allocated portion of the heap memory for execution of a pipeline comprising the first operator and the second operator. In some variations, the operations can further include identifying a plurality of operators for executing the query, the plurality of operators including the first operator and the second operator. In some related implementations, at least a portion of the plurality of operators are split among a plurality of pipelines including a first pipeline and a second pipeline, wherein the plurality of pipelines are executed in a determined order to generate results responsive to the query, and wherein executing the first pipeline comprises iteratively generating one or more blocks of data based upon operations contained within the first pipeline and storing the one or more blocks as intermediate results for the second pipeline.

In some variations, the operations can further include storing the first results in the first space and/or providing the first results for the second operator, wherein providing the first results for the second operator comprises providing access to the first space. In some related implementations, the first results are removed from the memory after the second operator finishes generation of the second results. In some related implementations, the operations can further include generating at least a second portion of the first results based on executing the first operator and/or storing, within the first space, the second portion of the first results. In some implementations, the first results comprise a data table. In some variations, the database execution engine is configured to provide query optimization of the query plan and select other execution engines to handle certain queries. In some aspects, the query can be received from an application separate from the database execution engine.

Implementations of the current subject matter can include systems and methods consistent with the present description, including one or more features as described, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
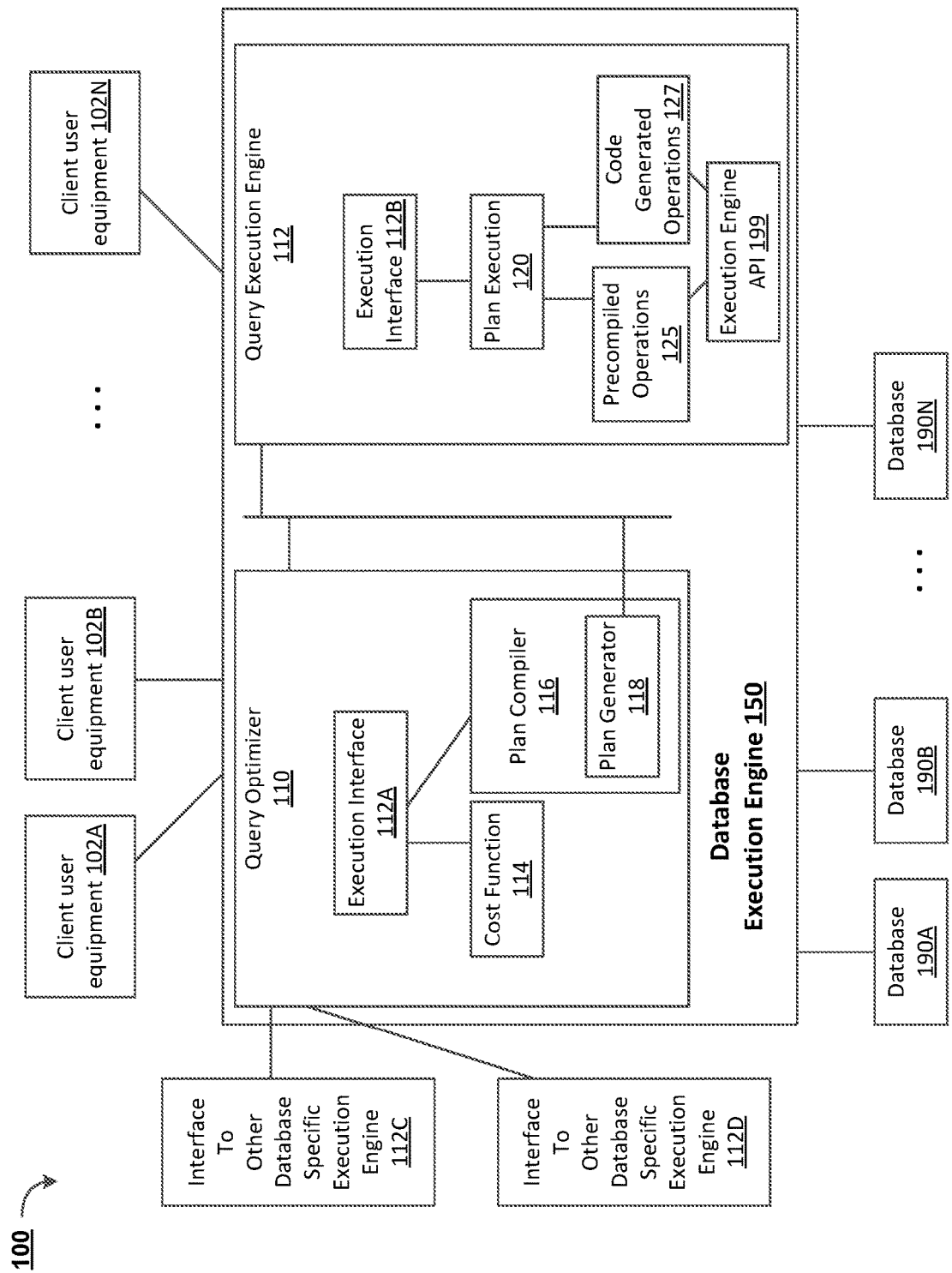
FIG. 1 depicts a block diagram of a system for query planning and/or execution, in accordance with some example implementations.

Database management systems and operations performed on the data managed by a database management system have become increasingly complex. For example, a database management systems (or database for short) can support relatively complex online analytical processing (OLAP, which can perform multi-dimensional analysis) to more straightforward transaction based online transaction processing (OLTP). Moreover, the database may be configured as a row-store database or column store database, each of which may have certain aspects with respect to queries and other operations at the database. For example, the database may encode data using dictionaries, while some databases may not. In addition to these various databases layer differences, the queries performed at a database can comprise a complex sequence of operations in order to generate corresponding responses. To implement the complex sequence, a query execution plan (or query plan for short) may be implemented. The query plan represents a sequence of operations, such as instructions, commands, and/or the like, to access data in the database. The database may also include a query plan optimizer to determine an efficient way to execute the query plan.

From an application or client perspective, it can be extremely cumbersome to access databases. For example, an application may need to query different types of databases using complex queries. As a consequence, the application layer in this example would need to be configured to handle the various types of databases and the various query types. Additionally or alternatively, each database may need to process queries from the application into a format and structure that can be handled by the given database. Pushing complex operations and support for a variety of different database types to the application layer may contravene the need to have relatively lighter weight and/or readily deployable applications. On the other hand, pushing complex operations to the database layer where data is stored may draw processing and/or memory resources at the database and may thus reduce the performance and response times for queries on that database layer.

In some example implementations, there may be provided an execution engine that may decouple the higher-level, application layer from the database layer (e.g., the persistence or storage layer where data including database tables may be stored and/or queried using instructions, such as commands and/or the like). The execution engine may be implemented separately from the database layer and/or the application layer. Furthermore, the execution engine may be configured to receive a query, generate a query plan (including for example query algebra), optimize the query plan, and/or generate executable code, which can be executed at runtime. The executable code may include pre-compiled code (which can be selected for certain operations in the query plan) and/or code that is generated just-in-time specifically for execution of the query plan.

The execution engine may be configured to perform some operations itself, while the execution engine may send some operations (e.g., relatively basic commands, such as reads, writes, scans, and/or the like) to the database layer. Furthermore, the execution engine may receive corresponding responses from the database layer where data is stored/persisted and certain commands, such as reads, writes, scans, and/or the like, can be performed. The execution engine may perform more complex execution operations, such as rule-based operations including relatively more complex operations such as joins, projections, and/or the like, while accessing the database's storage/persistence layer when needed to read, write, update, and/or perform other operations.

The execution engine may be configured to support a wide range of database types to reduce, if not eliminate, the need for specialized execution engines for each type of database. For example, rather than having an execution engine for each type of database (e.g., an execution engine for an OLAP database, another execution engine for an OLTP database, an execution engine for a row-store database, an execution engine for a column-store database, and/or the like), the execution engine disclosed herein can perform query execution for a variety of database types and send queries to the different types of database layers (and/or their storage/persistence layer) and handle the corresponding responses.

FIG. 1 depicts a block diagram of a system 100 for query planning and/or execution, in accordance with some example implementations. As illustrated, the system 100 may include one or more user equipment 102A-N, such as a computer, a smart phone, a tablet, an Internet of Things (IoT) device, and/or other computer or processor-based devices. The user equipment may include a user interface, such as a browser or other application to enable access to one or more applications, database layer(s), and/or databases, to generate queries to one or more databases 190A-N, and/or to receive responses to those queries.

In the example of FIG. 1, the databases 190A represent the database layer of a database management system where data may be persisted and/or stored in a structured way, and where the data can be queried or operated on using operations including SQL commands or other types of commands/instructions to provide reads, writes, and/or perform other operations. To illustrate by way of an example, user equipment 102A-N may send a query via an execution engine 150 to the database layer 190A-B, which may represent a persistence and/or storage layer where database tables may be stored and/or queried. The query may be sent via a connection, such as a wired and/or wireless connection (e.g., the Internet, cellular links, WiFi links, and/or the like).

The database execution engine 150 may include a query optimizer 110, such as a SQL optimizer and/or another type of optimizer, to receive at least one query from a user equipment and generate a query plan (which may be optimized) for execution by the execution engine 112. The query optimizer 110 may receive a request, such as a query, and then form or propose an optimized query plan. The query plan (which may be optimized) may be represented as a so-called "query algebra" or "relational algebra."

For example, SELECT Columns A and B, and perform an INNER JOIN on Tables A and B may represent a query received by the database execution engine 150 including the query optimizer 110. There may be several ways of implementing execution of this query. As such, the query plan may offer hints or propose an optimum query plan with respect to the execution time of the overall query. To optimize a query, the query plan optimizer 110 may obtain one or more costs for the different ways the execution of the query plan can be performed. The costs may be obtained via the execution interface 112A from a cost function 114, which responds to the query optimizer 110 with the cost(s) for a given query plan (or portion thereof), and these costs may be in terms of execution time at the database layer 190A-N, for example.

The query optimizer 110 may form an optimum query plan, which may represent a query algebra, as noted above. To compile a query plan, the query optimizer 110 may provide the query plan to the query plan compiler 116 to enable compilation of some, if not all, of the query plan. The query plan compiler 116 may compile the optimized query algebra into operations, such as program code and/or any other type of command, operation, object, or instruction. This code may include pre-compiled code (which can be pre-compiled and stored, and then selected for certain operations in the query plan) and/or just-in-time code generated specifically for execution of the query plan. For example, plan compiler may select pre-compiled code for a given operation as part of the optimization of the query plan, while for another operation in the query plan the plan compiler may allow a compiler to generate the code. The pre-compiled and generated code represent code for executing the query plan, and this code may be provided to the plan generator 118, which interfaces the query execution engine 112.

In some implementations, the query optimizer 110 may optimize the query plan by compiling and generating code. Moreover, the query optimizer 110 may optimize the query plan to enable pipelining during execution.

In some implementations, the query optimizer 110 may be configured to select other execution engines. For example, the query optimizer 110 may select via interface 112C an execution engine configured specifically to support a row-store database or an ABAP type database, or the query optimizer 110 may select via interface 112D an execution engine configured specifically to support a column-store type database. In this way, the query optimizer 110 may select whether to use the universal database execution engine 150 or legacy (e.g., database-specific) execution engines (available via interfaces 112C/D, for example).

The query execution engine 112 may receive, from the plan generator 118, compiled code to enable execution of the optimized query plan, although the query execution engine may also receive code or other commands directly from a higher-level application or other device, such as user equipment 102A-N.

The query execution engine 112 may then forward, via an execution interface 112B, the code to a plan execution engine 120. The plan execution engine may then prepare the plan for execution, and this query plan may include pre-compiled code 125 and/or generated code 127. When the code for the query plan is ready for execution during runtime, the query execution engine 112 may step through the code performing some of the operations within the database execution engine 150 and sending some of the operations (or commands in support of an operation, such as a read, write, and/or the like) to the execution engine application programming interface (API) for execution at one or more of databases layers 190A-N.

Table 1 below depicts an example of a query execution plan including a (1) TableScan (Filter X=1) and a (2) Materialization (Columns A, B). In this example, the TableScan would result in one or more calls via the execution engine API 199 to one or more of databases 190A-B. Specifically, the TableScan operator at Table 1 would result in a call for a dictionary look up for a value "X" and an indexvector scan with a valueid obtained from the dictionary look up, which results in a document ID list. Then for each document ID, a call is made via 199 to look up the value IDs for columns A and B. The value IDs may be used to look up dictionary values to materialize, the columns A and B including the actual data values for those columns.

TABLE 1

| Operator | Calls made on Database API |
| --- | --- |
| 1) TableScan (Filter X = 1) | dictionary lookup for value "X" indexvector scan with a valueid from the lookup, which results in a document ID (docid) list |
| 2) Materialization (Columns A, B) | For each docid, lookup value IDs (valueids) for columns A + B For the valueids, lookup dictionary value in dictionaries of A and B |

In some implementations, the query execution engine 150 may, as noted, be configured to handle different types of databases and the corresponding persistent layers and/or tables therein. For example, the database 190N may be implemented as a row-oriented database, so that an insert is performed by adding a row with a corresponding row identifier, while another database 190A may be implemented as a column store database, which may use dictionaries and compressive techniques when inserting data into a table. In this example, the query execution engine 150 may perform execution related to handling the differences between these two types of databases. This may enable a reduction in processing at the database layer 190A-N. Moreover, the query execution engine 150 may perform other operations including rule-based operations, such as joins and projections, as well as filtering, group by, multidimensional analysis, and/or the like to reduce the processing burden on the database layer. In this way, the query execution engine 150 may execute these and other complex operations, while the database's persistence/storage layer 190A-N can perform simpler operations to reduce the processing burden at the database's persistence/storage layer 190A-N.

In some example implementations, the query execution engine 150 may run, as noted above, just-in-time code 127 generated for some query operations, while pre-compiled code 125 may be run for other operations. Moreover, the query execution engine 150 may combine the generated code 127 with precompiled code 125 to further optimize execution of query related operations. In addition, the query execution engine 150 may provide for a plan execution framework that is able to handle data chunk(s), pipelining, and state management during query execution. Furthermore, the query execution engine 150 may provide the ability to access table storage via an abstract interface to a table adapter, which may reduce dependencies on specific types of storage/persistence layers (which may enable use with different types of storage/persistence layers).

In some example implementations, the database execution engine 150 may be provided with at least one table adapter. In some example implementations, the table adapter may generate an object, such as a table object, which can be stored in cache with other code, objects, and/or the like awaiting runtime execution of the query. In some example implementations, and the table object can be opened, during query execution, to provide access to a table stored in the persistence layer of a database.

Figure 2:
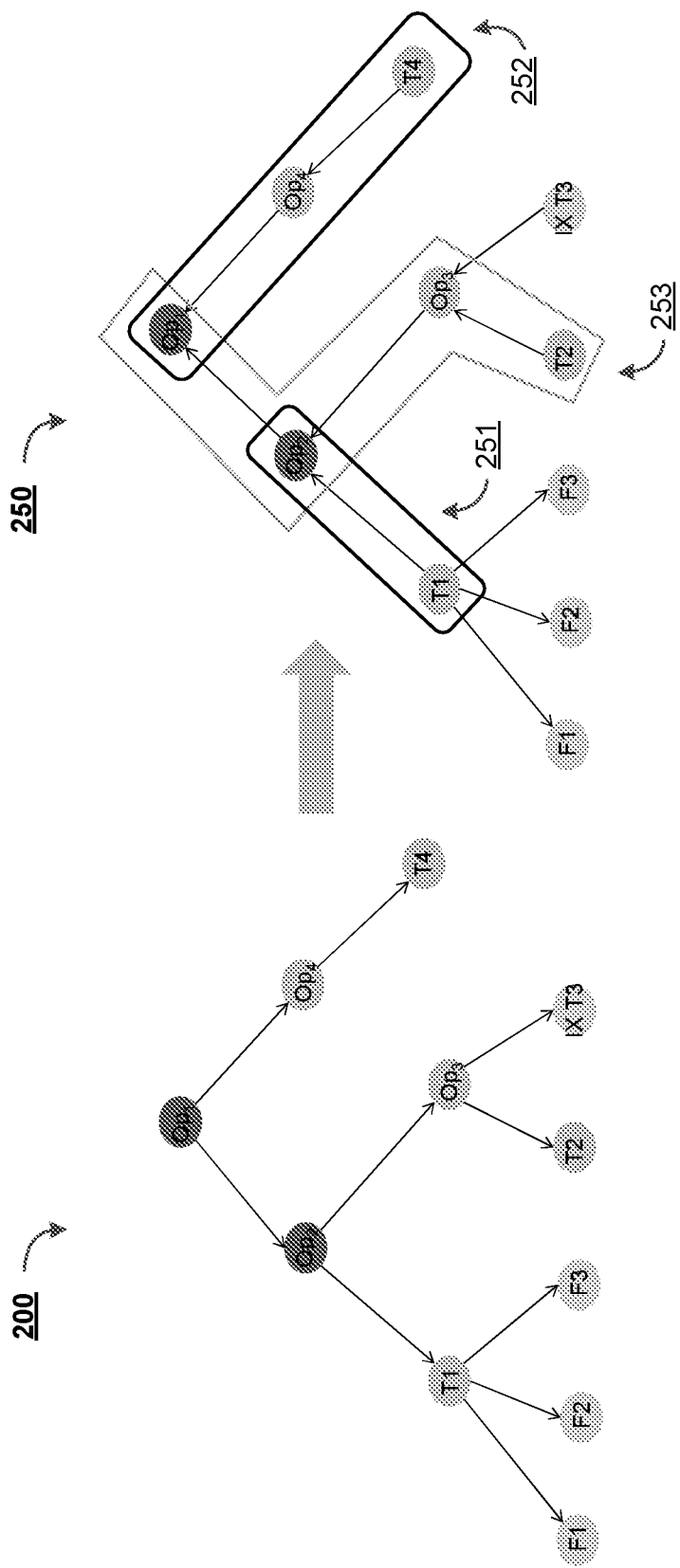
FIG. 2 depicts example query execution flow diagrams with and without pipelining, in accordance with some example implementations.

FIG. 2 depicts example query execution flow diagrams 200, 250 with and without pipelining, in accordance with some example implementations. As illustrated, the first query execution flow diagram 200 includes operators and table structures laid out in a hierarchical structure. The structure of the first query execution flow diagram 200 can be dependent upon the operators present within a query and/or tables utilized by the query. For example, as illustrated, operator $Op_1$ can be a function of operators $Op_2$ and $Op_4$ (e.g., a join, a hashjoin, or another function of two nodes). Operator $Op_2$ can be a function (e.g., a hashjoin) of table T1 and operator $Op_3$. Operator $Op_3$ can be a function of tables T2 and T3. For example, IX T3 can be an index lookup of table T3 and/or operator $Op_3$ can be a join of table T2 and the results of the index lookup on table T3. As illustrated, operator $Op_4$ can be a function of table T4 (e.g., a filter of table T4).

In some aspects, one or more of the tables T1-4 can be table scan operators. In some aspects, table scan operators can retrieve results from an underlying data table (e.g., a column store database/table), in a sequential manner, and/or based on one or more functions (e.g., filters). As illustrated, table T1 can be a table scan operator on an underlying table, based on functions F1-3. Although not illustrated, one or more of the remaining tables T2-4 can be table scan operators based on any number of filters (including zero).

In some implementations, the first query execution flow diagram 200 can be generated by translating a query into a (physical) algebraic expression and/or evaluating the query/ expression. In some aspects, the first query execution flow diagram 200 can just be a visual representation of the query/expression, which may instead exist in the form of programming code. In some database systems, the first query execution flow diagram 200 can be executed through volcano style processing (e.g., via an iterator model), where each operator can produce a tuple stream from its input and/or allow for iterating over the tuple stream by repeatedly calling the next function of the operator. Accordingly, in some aspects, parent nodes in the first query execution flow diagram 200 can be regarded as "pulling" results from their child nodes. For example, in some aspects, the operator $Op_1$ may produce tuples by first repeatedly asking its left input (operator $Op_2$) for tuples, placing the received tuples in a hash table, repeatedly asking its right input (operator $Op_3$) for tuples, and/or probing the hash table for each tuple. The input sides could act in a similar manner, recursively asking for tuples from its child nodes and so on. However, although this approach can be simple to implement, it can consume more CPU than necessary (potentially thousands to even millions of times more than necessary), which can be due to poor cache locality (e.g., information which is necessary during execution is not present within and/or needs to be loaded into a cache) and/or complicated book-keeping (e.g., keeping track of intermediate results).

In order to reduce some of these inefficiencies, pipelining may be used. Pipelining can refer to the use of one or more operators which pass data to their parent operators without copying or otherwise materializing the data. As such, in some aspects, child nodes in the second query execution flow diagram 250 can be regarded as "pushing" results to their parent nodes. For example, instead of pulling tuples up, pipelined operators push tuples towards the consuming operators until the end of the pipeline. In order to decide which operators can be pipelined and/or the distribution of the operators among a plurality of pipelines, the query optimizer 110 (or some portion thereof), for example, can determine which, if any, of the operators in a query are "pipeline breakers."

In some aspects, a pipeline breaker can refer to an operator that takes an incoming tuple out of a storage location (e.g., a portion of memory and/or a CPU register) for a given input side and/or materializes at least a portion of (e.g., all) incoming tuples from the input side before continuing processing. In some aspects, pipeline breakers and/or the contents of a given pipeline can be determined on multiple factors, such as whether an operator will spill data out of a cache and/or over into memory (e.g., external to cache memory). For example, in some implementations, operator $Op_1$ and operator $Op_2$ can be pipeline breakers, and/or can be set as the final operations in at least one of the pipeline 251-253. In some implementations, other factors can be used to determine where pipelines start, end, and/or what operators each pipeline contain.

Whatever procedure for generating pipelines is used, as illustrated, a first pipeline 251 can be formed to include table T1 and operator $Op_2$, a second pipeline 252 can be formed to include table T4, operator $Op_3$, and operator $Op_1$, and/or a third pipeline 253 can be formed to include table T2, operator $Op_4$, operator $Op_2$, and operator $Op_1$. When execution reaches the end of a pipeline 251-253, results can be materialized and/or placed within a storage container/location (e.g., a hash table) for the pipeline-breaking operator. For example, the results of the first pipeline 251 can be materialized and/or placed within a hash table for operator $Op_2$, then the results of the second pipeline 252 can be materialized and/or placed within a hash table for operator $Op_1$, and then the results of the third pipeline 253 can be materialized and/or placed within a hash table for operator $Op_1$.

In some aspects, pipelining can be regarded as organizing a query into a hierarchical plan of operators, identifying a plurality of paths within the hierarchical plan (e.g., where each path includes an endpoint operator that lies within another path and/or is shared between two paths), generating and pushing one or more chunks of data up a first path to accumulate results at the endpoint, and/or generating and pushing one or more chunks of data up a second path to generate output results based on the accumulated results from the first path. Additional paths can be present and/or additional generation of chunks can occur, depending upon the query (e.g., depending on how many paths are required to pipeline the operators). In some aspects, a chunk of data can be regarded as generated data which is responsive to an operator, but does not contain all of the data required for execution of the query or the pipeline. However, in some implementations, depending upon the operator and/or portion of the database in question, a single "chunk" of data can contain all information responsive to a particular operator. For example, a scan of a small table may only require one chunk of data to be passed through a pipeline.

Non-pipelined query execution can be regarded as organizing a query into a hierarchical plan of operators, recursively calling a first child operator (and potentially its child operators) of the root node until all results of the first child operator are determined and/or stored, recursively calling a second child operator (and potentially its child operators) of the root node until all results of the second child operator are determined and/or stored, and/or processing the results of both child operators based on the root node after the results are determined and/or stored.

The use of pipelining can increase memory locality and/or reduce processing time/effort for database queries, as the number of memory accesses can be reduced. In some implementations, pipelining can take advantage of parallel processing systems and/or techniques. In some aspects, the first query execution flow diagram 200 and/or the second query execution flow diagram 250 can be regarded as at least a portion of a query execution plan. Additional processing and/or code generation can occur before or after the query execution flow diagrams 200, 250 are generated, which can help to optimize processing resources and/or reduce query execution time.

Figure 3:
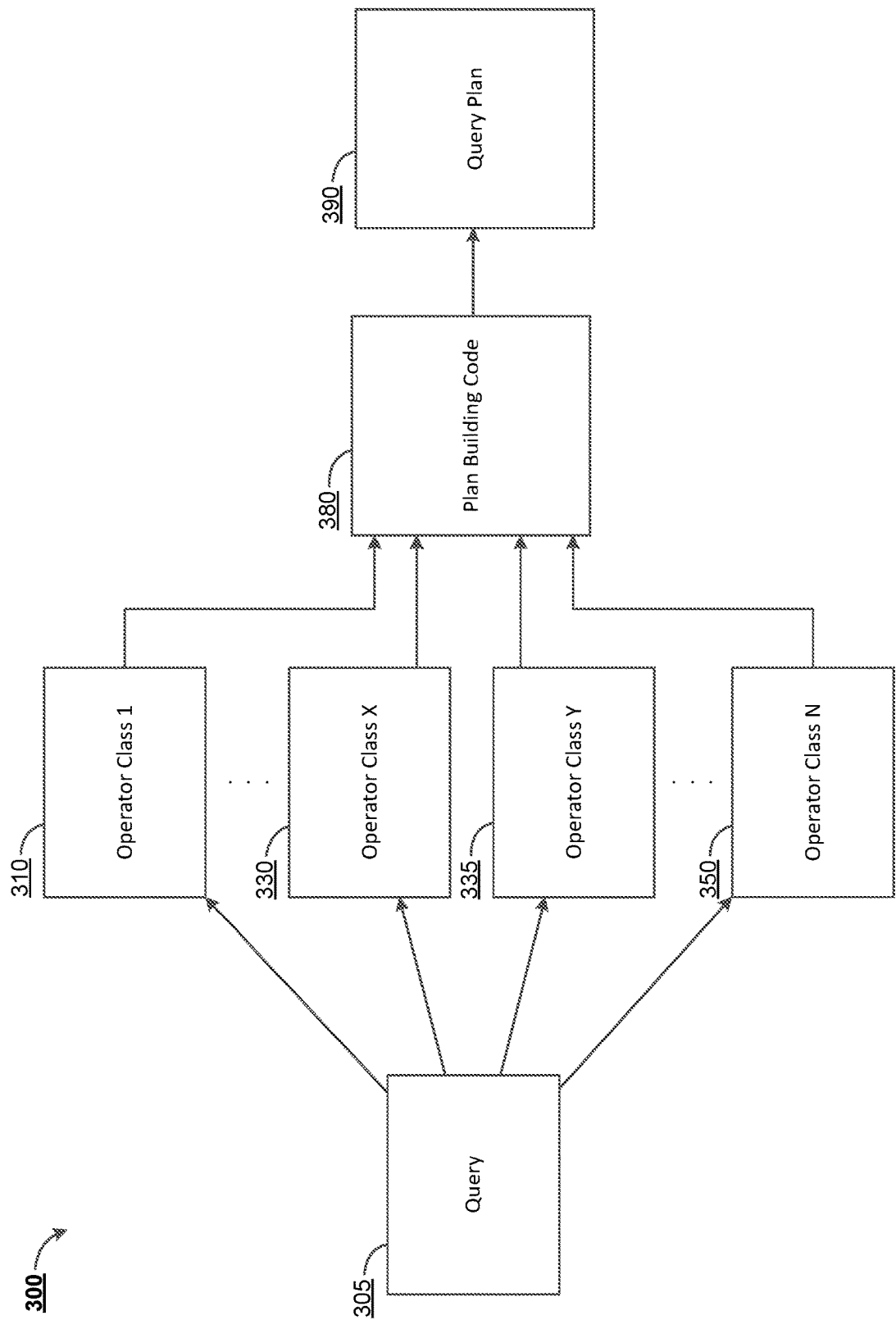
FIG. 3 depicts a block diagram of an example query planning procedure, in accordance with some example implementations.

In some aspects, one or more of the query operators can utilize data/information which is generated by at least one other query operator. For example, one operator may access and/or combine information generated by a plurality of other operators that occur earlier in time. FIG. 3 depicts a block diagram of an example query planning procedure 300, in accordance with some example implementations.

As illustrated, a query 305 can be received and/or processed to generate a query plan 390 for executing the query 305. One or more operator classes 310-350 can be generated and/or selected, based upon the query 305. At least a portion of the operator classes 310-350 can be used to build a query plan 390, based upon query plan building code 380. An operator class 310-350 can be regarded as a definition for one or more operators. An operator class 310-350 can be defined to include one or more attributes of a corresponding operator, such as an identifier for the operator, an indication of what type of operator the operator is, whether the operator is public, what inputs are required for the operator, what output(s) are produced, how the output(s) are produced, where the inputs are located, whether or not the inputs exist before execution time, and/or the like.

In some aspects, one or more of the operator classes 310-350 can define one or more of the precompiled operators 125 and/or code generated operators 127. Although the precompiled operators 125 and code generated operators 127 are illustrated within the query execution engine 112, they can be utilized during query plan generation and/or optimization. For example, the operator class 310 can define a precompiled operator 125, which is included in a query plan generated by the query optimizer 110 (or some portion thereof, such as the plan generator 118). In another example, the operator class 330 can define a code generated operator 127, which is included in a query plan generated by the query optimizer 110 (or some portion thereof). Other techniques for generating and/or utilizing operator classes 310-350 are possible.

The class definitions and the code for building the query plan can be defined based upon code, such as L programming language code of another type of code. Classes can define operators using different programming languages and/or include more or less information than what is described. For example, each class 310-350 can be defined to include any number of attributes (including zero), which can depend upon the query and/or operators processed/executed. Similarly, the code used for building a query plan can be in a different programming language and/or more or less code may be used for defining a query plan 390.

Each operator/class 310-350 utilized (e.g., accessed) by a query 305, can be analyzed to determine whether there may be any optimizations of the operators and/or the operators can be added to the query plan 390. Once the query plan 390 is generated, it may be provided to and/or executed by the query execution engine 112. Additionally or alternatively, executable code corresponding to the query plan 390 can be generated and/or provided to and/or executed by the query execution engine 112. In some implementations, one or more of the operator classes 310-350, at least a portion of the query plan building code 380, and/or at least a portion of the query plan 390 can be generated by processing the query 305.

Figure 4:
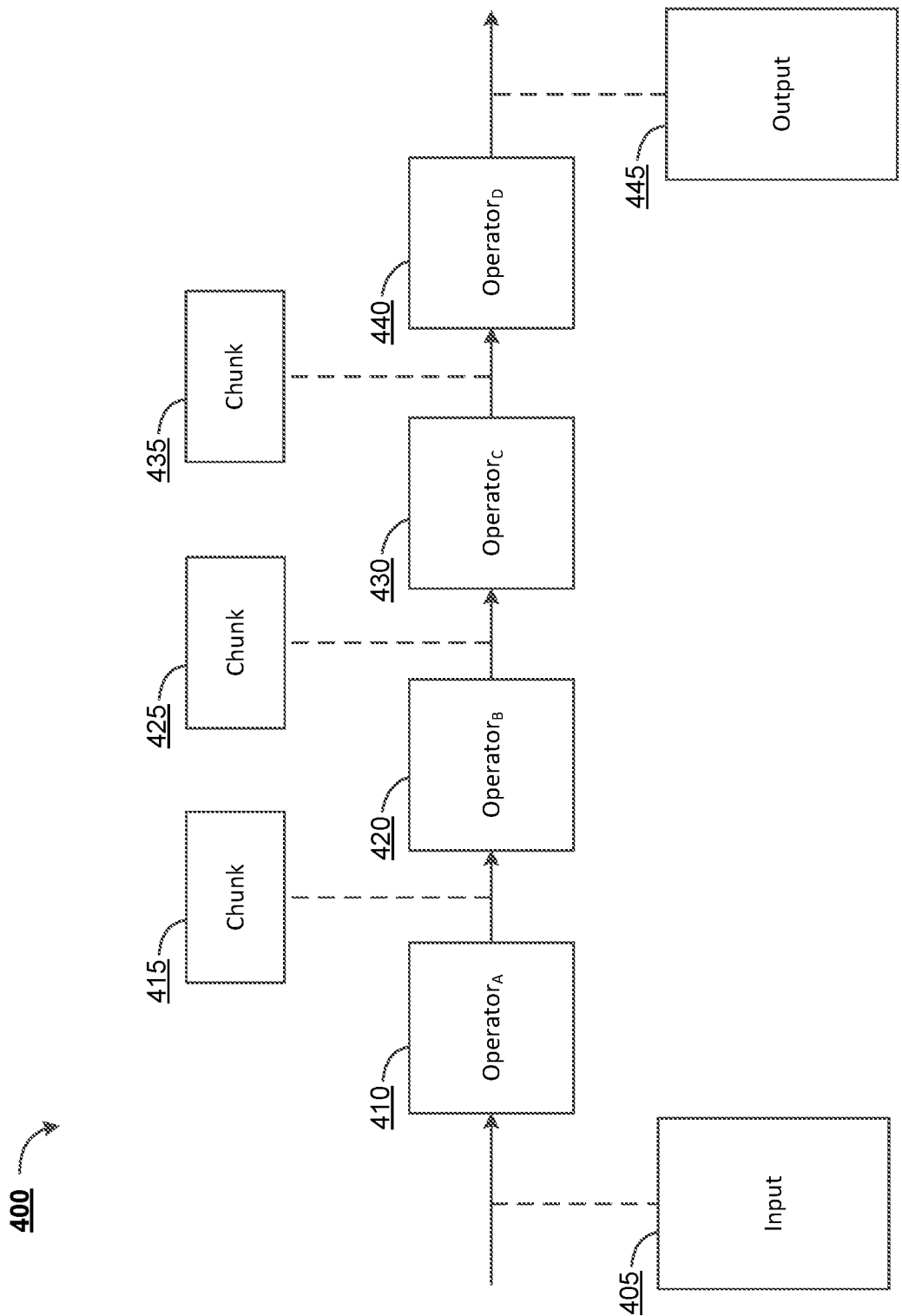
FIG. 4 depicts a block diagram of an example query plan, in accordance with some example implementations.

FIG. 4 depicts a block diagram of an example query plan 400, in accordance with some example implementations. As illustrated, the query plan 400 can include a plurality of operators 410-450, which, in some aspects, can be executed within one or more pipelines. The operators 410-450 can be similar to the operators of FIG. 1 and/or similar to the operators defined by the classes 310-350 of FIG. 3. For example, the operators 410-450 can comprise one or more operators, such as a scan, materialize, filter, group, group local, merge, group merge, join, hash join, table scan, and/or the like.

The query plan 400 (e.g., at least the illustrated portion) can begin at operator A 410, where a first data chunk 415 is created. This data chunk 415 can be generated by operator A 410 based upon input data 405. This chunk 415 can be passed to operator B 420, which can generate a second chunk 425 (e.g., based upon the first chunk 415). Next, operation can proceed to operator C 430, where a third chunk 435 is generated (e.g., based upon the second chunk 425). Once the three chunks 415, 425, 435 are generated, operation can next proceed to operator D 440, which can utilize one or more of the chunks to provide output 445, which can be stored in memory. In some aspects, the output 445 can be stored in the memory along with at least a portion of the other chunks generated during the execution of the query plan 400. After the output 445 is stored within the memory, it may be required by another operator. The other operator can pull the output 445 from the memory or the output 445 can be pushed to the other operator.

In some implementations, one or more of the input 405, the chunks 415, 425, 435, and/or the output 445 can be stored in a cache, and/or one or more of the operators 410-440 can operate on one or more of the chunks 415, 425, 435 in place. For example, a first column of data generated for the chunk 415, by operator A 410, may be stored in a cache. In turn, operator B 420 can review the first column of the chunk 415 and/or generate a second column of data within the chunk to generate the chunk 425. Operator C 430 can operate in a similar manner, generating another column of data for the chunk 425 in place to form the third chunk. Additionally or alternatively from adding columns, one or more of the operators B-D 420-440 can alter data within a chunk. Chunks of data can be continually generated through the execution of the query plan 400, which can be continually provided for storage (e.g., for use by another pipeline, operator, as results to a query and/or the like).

Figure 5:
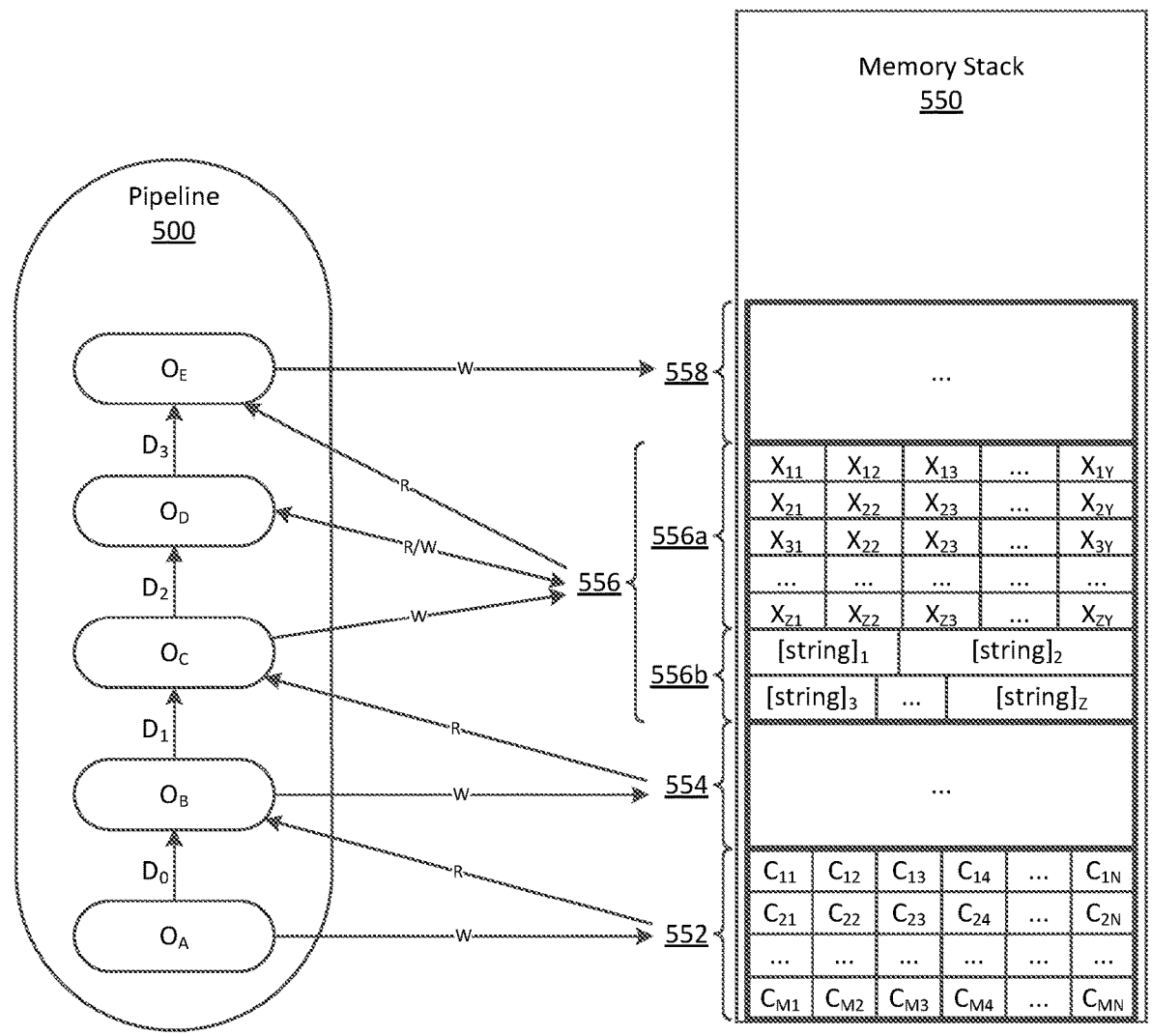
FIG. 5 depicts a block diagram of an example pipeline and allocated memory, in accordance with some example implementations.

Instead of allocating memory for each chunk 415, 425, 435 separately on the heap memory, as the operators 410, 420, 430 pass the chunks 415, 425, 435 through a pipeline, one large block of memory may be allocated. From this block, portions can be provided for storage of the chunks in a more efficient fashion. For example, FIG. 5 depicts a block diagram of an example pipeline 500 and allocated memory 550, in accordance with some example implementations. The pipeline 500 can be part of a query plan, similar to the query plan 400 of FIG. 4. The pipeline 500 and/or a subsequent pipeline can process data (e.g., in chunks) to form output results. As illustrated and described, the pipeline 500 can allocate/utilize memory locations for storage of such chunks in a stack-like fashion.

As illustrated, the pipeline 500 can include five operators: operator $O_A$, operator $O_B$, operator $O_C$, operator $O_D$, and operator $O_E$. In some aspects, execution of the pipeline 500 can begin at operator $O_A$, which can include an operator (e.g., code) that generates chunk(s) of data. In order to provide each chunk to the next operator $O_B$, operator $O_A$ may need to store the generated chunk in a location that is accessible to operator $O_B$. Therefore, in some implementations, the query execution engine 150, for example, can allocate memory for a chunk 552 within the memory stack 550. Similarly, the query execution engine 150 can allocate memory for a chunk 554 used by operator $O_B$, memory for a chunk 556 used by operator $O_C$, and/or memory for a chunk 558 used by operator $O_E$. Although more than one operator may read and/or write to any one of the chunks 552-558, the initial operator $O_{A-E}$ for which the respective chunk 552-558 is allocated can dictate when the chunk 552-558 is allocated/assigned and/or deallocated/cleared.

In some aspects, the size and/or location of each of the chunks 552-558 can be based upon one or more factors. For example, the size of the chunk 552 can be based upon the number of columns required by the operator $O_A$ (e.g., per row of results), the type of data for each column (e.g., integer, string, etc.), and/or the size of a cache utilized for operations (e.g., layer two L2 cache). In an example implementation, the chunk 552 can be allocated such that a maximum number of rows are provided for results from the operator $O_A$, consistent with the size of an L2 cache and the size required (e.g., a maximum size) for each row of results generated. Although L2 cache is described as a size limitation, other size limitations can be used, such as an L1 cache size, a predefined and/or user specified size, and/or the like.

The memory stack 550 can be specific/local to the pipeline 500 and/or may be allocated when the pipeline 500 begins execution (or before). In order to allocate the memory stack 550, the query execution engine 150, for example, can determine a location within a heap memory that has enough contiguous memory to store the memory stack 550. The size and/or location of the allocated memory stack 550 can be based upon one or more factors. For example, the size of the memory stack 550 can be based upon the size of the chunks 552-558, the size of a cache utilized for operations (e.g., layer two L2 cache), and/or the like.

In some implementations, it may be difficult to estimate the correct amount of memory required for a pipeline, such as the pipeline 500. This can require a balance of minimizing the number of memory allocations within the heap (which can be costly) compared to minimizing the amount of unused space allocated for a pipeline. If space is not as much of an issue, then the query execution engine 150 and/or some other system/process responsible for allocating the memory stack 550 can err on the side of the former and allocate more memory for the memory stack 550, such that no (or minimal) additional memory allocations are required for execution of the pipeline 500.

Once the chunk 552 is allocated, the operator $O_A$ can store results generated during its execution. In turn, the results stored within the chunk 552 can be utilized by the next operator or potentially any other operation. For example, as illustrated, operator $O_B$ may read the results of operator $O_A$ from the chunk 552. In some aspects, operator $O_A$ may write results to the chunk 552 until it cannot fit any additional results, and then control of operation may be passed from operator $O_A$ to operator $O_B$. Before or as part of control passing from operator $O_A$ to operator $O_B$, descriptor $D_0$ can be provided to operator $O_B$. The descriptor $D_0$ can include information indicating the location of the chunk 552 (e.g., pointer to the beginning of the chunk 552, address of beginning of the chunk 552, address of the end of the chunk 552, address of beginning of the memory stack 550, address of the end of the memory stack 550, and/or the like), the logical layout of the chunk 552 (e.g., number of columns in the chunk 552, type of data for each column in the chunk 552, and/or the like), the number of rows in the chunk 552, and/or the like. Based upon at least a portion of the information in the descriptor Do, the size of the chunk 552 can be determined.

Based upon the information in the descriptor Do, the operator $O_B$ can read data from the chunk 552 when control is passed to operator $O_B$. In turn, the operator $O_B$ can write results to another chunk 554 in the memory stack 550, which may be allocated/assigned for use by the operator $O_B$. After the operator $O_B$ has written a certain amount of results to the chunk 554 (e.g., as many rows as the operator $O_B$ can fit based upon the size of the chunk 554), descriptor $D_1$ relating to the chunk 554 can be provided to operator $O_C$ and/or control can pass to the operator $O_C$. Operator $O_C$, operator $O_D$, and/or operator $O_E$ can proceed in a similar manner. As illustrated, some operators, such as operator OD, can read from and write to the same chunk 556, and/or do not need additional space in memory. Providing the chunk 556 for use by operators $O_{C-E}$ can save time/memory necessary to copy and/or provide results for the next operator. In some aspects, this copying can be in addition to the generation and/or storage of the results performed by the prior operator(s) (e.g., operators $O_{A-E}$).

In various aspects, at least a portion of the operators $O_{A-E}$ can require different data structures for the storage of results. For example, in some aspects, N columns may be required for storage of results generated by operator $O_A$. Based upon N and the size of the columns, chunk 552 can be allocated such that it is capable of storing M rows. In some aspects, certain data types, such as strings, can be handled in a different manner. For example, if operator $O_C$ requires space for the storage of Y columns, where at least one of the columns contains strings, then space can be allocated within the memory heap 550 similar to the format illustrated with respect to chunk 556. As illustrated, two portions of the chunk can be allocated/provided. In the first portion 556a, space for storage of rows with the Y columns can be allocated. In the second portion 556b, space for storage of the strings can be allocated. As strings can vary in length, in some implementations, a set size per string is not allocated. However, an average size of the strings generated by operator $O_C$ can be estimated for the allocation of the space for the second portion 556b. When the operator $O_C$ needs to store a string, it can provide the string to the query execution engine 150, which can handle storing the string in the second portion 556b instead of the first portion 556a. For example, in some implementations, if the second column (e.g., $X_{*2}$, where * varies by row) is the column which should contain strings, then each string can instead be stored in the second portion 556a (e.g., one after another), and/or a pointer to the beginning of the corresponding string can be stored in the second column (e.g., $X_{*2}$). Thus, the operator $O_C$ does not need to keep track of how/where to store strings, which can reduce the operational complexity of a query. When a subsequent operator attempts to access the column where a string would otherwise be stored, it may be aware that a pointer is stored in this location, and may access the corresponding string from the second portion 556b based upon the pointer. In some implementations, the string stored in the second portion can be provided by the query execution engine 150 to the operator $O_D$.

Although N columns are described as affecting the number (M) of rows that can be stored within chunk 552, the M rows required can instead affect the number (N) of columns that may be stored. Similarly, Z rows required can instead affect the number (Y) of columns that may be stored within chunk 556.

Once control of operation reaches the end of the pipeline 500 (e.g., after operator $O_E$ generates its results for the chunk 558), control may progressively return backwards through the pipeline. As control returns (e.g., from the top/end of the pipeline 500 towards the bottom/beginning), the space allocated for each of the blocks 558, 556, 554, 552 can be released and/or the data stored therein can be erased/removed. However, in some aspects, one or more of the operators $O_{A-E}$ may not have completed generation of their results based upon the chunk generated/provided by a preceding operator. For example, in some implementations, operator $O_B$ may have only been able to generate half of the data it needs to generate based upon the chunk 552 provided by operator $O_A$. Therefore, when control returns to operator $O_B$, operator $O_B$ may generate additional results, which operator $O_B$ stores again in chunk 554.

In such an implementation, chunk 558 may be erased and/or released when control returns to operator $O_D$ (as operator $O_D$ does not utilize chunk 558), chunk 556 may be erased and/or released when control returns to operator $O_B$ (as operator $O_B$ does not utilize chunk 556), and/or chunk 554 may be erased but not released when control returns to operator $O_B$ (as operator $O_B$ still needs to utilize chunk 554, but needs space for the new results). Therefore, this memory location can be reused by operator $O_B$ until it is no longer needed. Although operator $O_B$ is described as being the first operator which needs to generate additional results based upon the results provide by a previous operator, other operators may have similar requirements.

Once operational control returns to operator $O_A$, chunk 552 can be erased by the structure/location can be maintained for use by the operator $O_A$ to generate/store additional results. At least a portion of these procedures can be repeated until operator $O_A$ is finished generating results, operator $O_B$ is finished generating results based upon the results generated by operator $O_A$, operator $O_C$ is finished generating results based upon the results generated by operator $O_B$, and so forth. Once execution of the pipeline 500 is complete, then the memory stack 550 can be deallocated (e.g., from the heap). Instead of requesting/allocating memory for storage of results within a heap multiple times, less memory requests/allocations are required. Further, the results can be stored in the same memory stack 550 as they are generated, and the memory stack 550 can be reused. In some aspects, if another pipeline exists which has similar requirements to the pipeline 500, then the memory stack 550 can be provided for use by the other pipeline (e.g., after completing the execution of the pipeline 500).

In some aspects, operator $O_A$ can read and/or be provided with data for execution from a memory location outside of the memory stack 550. The location of this data can be provided to operator $O_A$ by the query execution engine 150 when required by the operator $O_A$, or at some point in time prior to execution of operator $O_A$. In some embodiments, the location of the data used by operator $O_A$ can be within another memory stack (e.g., similar to memory stack 550), within heap memory, within another computer system, and/or the like.

Similarly, partial and/or complete results of the execution of the pipeline 500 can be stored within the memory stack 550 or another memory location outside of the memory stack 550 (e.g., within another the memory stack) and/or provided for use by another pipeline. If the pipeline 500 contains the last operator which needs to be executed in order to complete the execution of a query, then the results of the pipeline 500 can be materialized. In some implementations, the last operator in the pipeline 500, operator $O_E$, can be an operator which materializes the results.

In some implementations, one or more memory stacks 150 can be utilized for remote direct memory access (RDMA). For example, in an example implementation, the results of operator $O_E$ can be stored within the memory stack 550 or a separate memory location, such as another (e.g., non-contiguous) location within a heap memory. These results can be stored as one or more chunks. When a sufficient amount (e.g., a threshold or all) of results are generated based upon the execution of operator OE, information on the location of the results can be provided to another (e.g., remote) computer/system. This information can include a beginning address of a memory location where the results are stored, an ending address of the memory location, a size of the memory location, a pointer to the memory location, and/or the like. In turn, the other computer/system can access the results for use in the execution of a query, for example.

In various implementations, operator $O_A$ generates results on a row-by-row basis. However, in other implementations, operator $O_A$ can generate results on a column-by-column basis. In some aspects, the manner in which results are generated/stored can depend on any one of the operators $O_{A-E}$, the query being executed, the manner in which data used for generation of results is stored (e.g., in a row store or a column store database), and/or the like.

Although the chunks 552-558 are described as being "allocated" for storage of information, in some aspects, this allocation can involve determining a pointer to a location that is sufficiently far enough away from the bottom of the memory stack 550 and/or the preceding/lower chunk(s) 552-556 in the stack to store results (e.g., chunks) from the operators $O_{A-E}$. For example, when the chunk 552 is allocated for operation $O_A$ to store results, the query execution engine 150 can determine the largest size of space that operation $O_A$ may use, given some number of parameters. Based upon this size, the query execution engine 150 can determine a location within the memory stack 550 that is far enough away from the bottom of the memory stack 550 to contain the space, and this location can be provided to the operator $O_A$ for use during execution. Providing the location to the operator $O_A$ can include providing a physical memory address and/or a pointer to the address.

Although five operators $O_{A-E}$ are illustrated, in various implementations, more or less operators may be present. Similarly, although a specific requirements/results of the operators $O_{A-E}$ are described in a specific order, other orders, requirements, results, and/or the like are possible. Although the query execution engine 150 is described as performing the allocations for and/or management of the memory stack 550, additional or alternative components of a system (e.g., of system 100 of FIG. 1) can perform these tasks.

Allocating memory for the storage of results in the manners described can simplify/expedite processing of a query, reduce the amount of memory accesses/copies required, decrease the processing resources required to execute a query, and/or decrease the processing time of a query. For example, two or more operators (and/or two or more pipelines) can share information with each other through the use of the memory stack 550, which can increase memory locality (e.g., cache locality), decrease memory latency, and/or decrease processing time.

At least a portion of the operators $O_{A-E}$ and/or the query execution engine 150 can be configured to store results within a cache. Additionally or alternatively, in some aspects, the operators $O_{A-E}$ and/or the pipeline 500 may be configured to transparently store results within a cache (e.g., CPU cache) without action from the execution engine 150, operators $O_{A-E}$, and/or the pipeline 500. If the results remain in the cache, then a subsequent operator which accesses the cache does not need to perform additional steps and/or copy/determine the results itself. Doing so can increase memory locality. However, even if results are stored within a local memory (e.g., as opposed to a cache or a database, such as in a heap), then memory locality can still be increased during execution of a query, as a subsequent operator does not need to access the results from a database or recalculate the information contained in the results itself. In some aspects, the memory allocated within/by the memory stack 550 can be contiguous, which can help to increase memory locality and/or decrease the occurrence of cache misses. Additionally, controlling when/how results are generated, where results are stored, and/or how results are provided to subsequent operators can help to control when/how many memory/database accesses are made during query execution.

Although main memory, cache, heap, etc. are described, other portions of memory can be utilized. Although specific operators are described, such as scan, materialize, filter, group, group local, merge, group merge, join, hash join, table scan, etc., other operators are possible. Similarly, although specific data structures of states are described, such as tables, chunks, stacks, pointers, descriptors, strings, etc., other data structures are possible, such as maps, hash tables, numbers, vectors, handles, sources, sinks, some combination thereof, and/or the like. Although several systems, methods, operators, procedures, etc. are described with respect to pipelining, one or more of the aspects described herein can be implemented outside of a pipeline.

Figure 6:
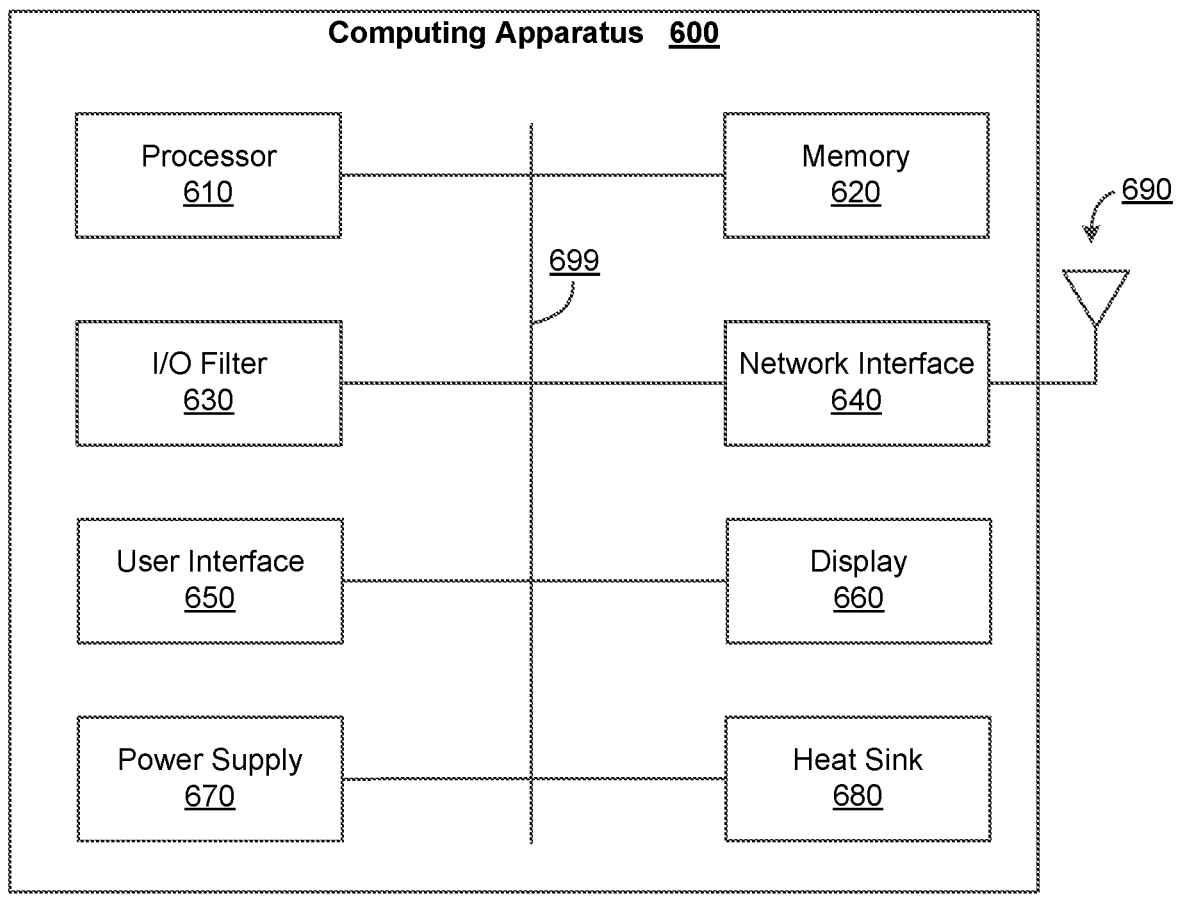
FIG. 6 depicts a block diagram of an example computing apparatus, in accordance with some example implementations.

FIG. 6 illustrates an example computing apparatus 600 which may be used to implement one or more of the described devices and/or components, in accordance with some example implementations. Similarly, the computing apparatus 600 may perform one or more of the processes described herein. In some aspects, at least a portion of the computing apparatus 600 can form at least a portion of the client user equipment 102A-N, the interfaces to other execution engines 112C-D, the database execution engine 150, and/or the databases 190A-N.

As illustrated, computing apparatus 600 may include one or more processors such as processor 610 to execute instructions that may implement operations consistent with those described herein. Apparatus 600 may include memory 620 to store executable instructions and/or information. Memory 620 may include solid-state memory, solid-state disk drives, magnetic disk drives, or any other information storage device. Apparatus 600 may include one or more network interfaces, such as network interface 640, which can be configured to communicate over wired networks and/or wireless networks. Wireless networks may include WiFi, WiMax, Bluetooth, and cellular networks (2G/3G/4G/5G), and/or any other wireless network. In order to effectuate wireless communications, the network interface 640, for example, may utilize one or more antennas, such as antenna 690.

Apparatus 600 may include one or more user interface, such as user interface 650. The user interface 650 can include hardware or software interfaces, such as a keyboard, mouse, or other interface, some of which may include a touchscreen integrated with a display 660. In various implementations, the user interface 650 can include one or more peripheral devices and/or the user interface 650 may be configured to communicate with these peripheral devices.

The apparatus 600 may also comprise an input and output filter 630, which can filter information received from and/or transmitted to a user interface 650, a network interface 640, and/or the like. The apparatus 600 may be powered through the use of one or more power sources, such as power source 670. One or more of the components of the apparatus 600 may be cooled off through the use of one or more heat sinks, such as heat sink 680. As illustrated, one or more of the components of the apparatus 600 may communicate and/or receive power through a system bus 699.

In some implementations, the computing apparatus 600 can be used to implement at least a portion of a database management system. In some aspects, a database management system may be a hardware and/or software system for receiving, handling, optimizing, and/or executing database queries. In some aspects, a database, as referred to herein, can be a structured, organized collection of data, such as schemas, tables, queries, reports, views, and/or the like, which may be processed for information. A database may be physically stored in a hardware server or across a plurality of hardware servers. In some aspects, a database management system may be a hardware and/or software system that interacts with a database, users, and/or other software applications for defining, creating, updating the structured data, and/or for receiving, handling, optimizing, and/or executing database queries.

For example, the computing apparatus 600 can provide one or more features of a high-level programming software system or other software that includes database management features. The computing apparatus 600 can also aggregate or otherwise provide a gateway via which users can access functionality provided by one or more external software components. One or more client machines can access the computing apparatus 600, either via a direct connection, a local terminal, or over a network (e.g. a local area network, a wide area network, a wireless network, the Internet, or the like).

The computing apparatus 600 can be configured to access a database that includes at least one table, which can in turn include at least one column. The database table can store any kind of data, potentially including but not limited to definitions of scenarios, processes, and one or more configurations as well as transactional data, metadata, master data, etc. relating to instances or definitions of the scenarios, processes, and one or more configurations, and/or concrete instances of structured data, such as objects that are relevant to a specific instance of a scenario or a process, and the like. The database can be external to the computing apparatus 600 or may be part of the computing apparatus 600 (e.g., at least partially stored in the memory 620). In some aspects, the memory 620 may be utilized to store at least a portion of a database and/or function as an in-memory database.

For example, a processor 610, a network interface 640, and/or a user interface 650 may be configured to receive and/or load a database table or other comparable data set, into the memory 620 (e.g., in response to receipt of a query instantiated by a user or computer system through one or more client machines, external software components, core software platforms, and/or the like).

Figure 7:
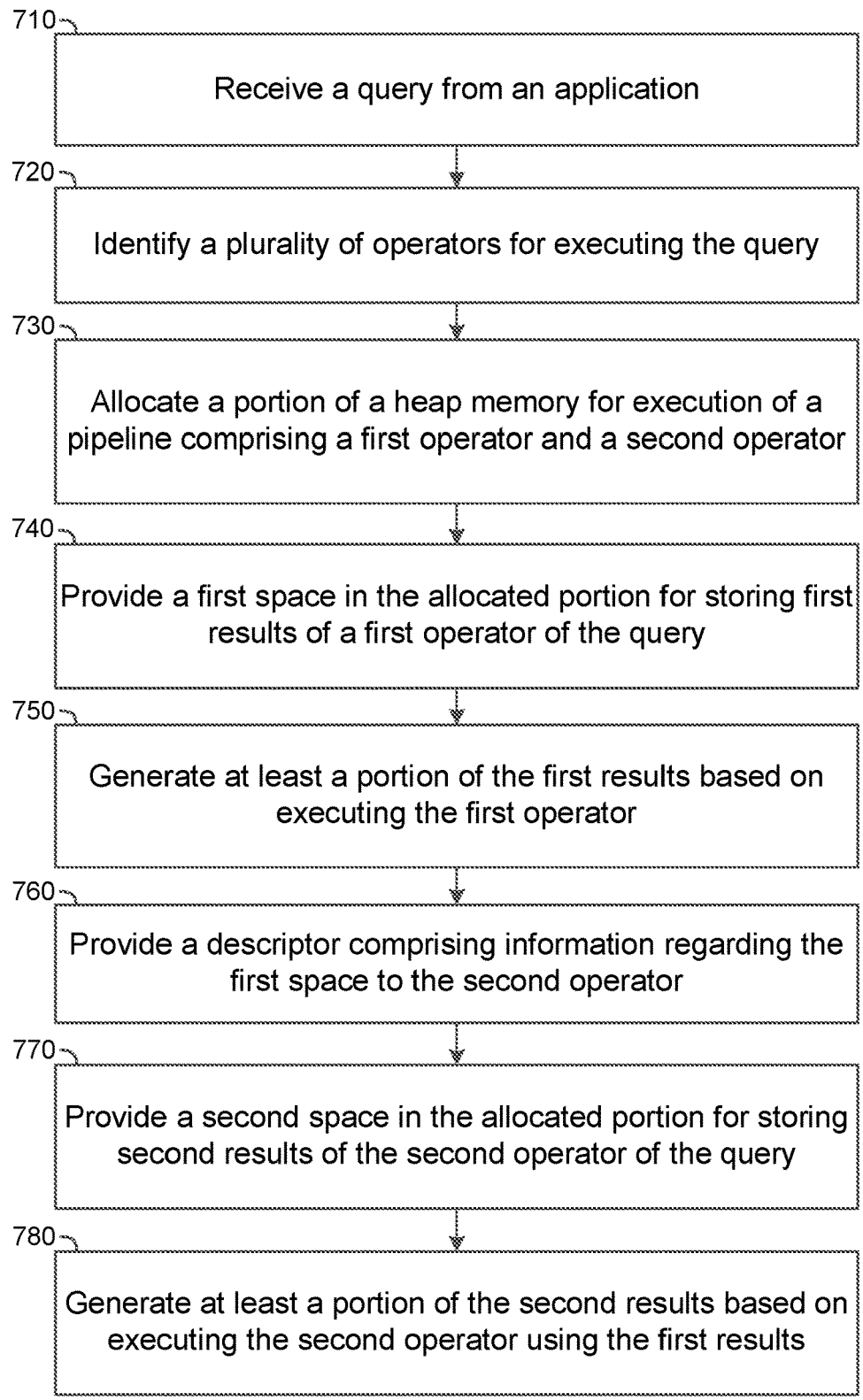
FIG. 7 depicts an example of a method for database query planning and/or execution, in accordance with some example implementations.

FIG. 7 depicts an example of a method 700 for database query planning and/or execution, in accordance with some example implementations. At least a portion of the method 700 can be performed by a computing apparatus 600, which can form at least a portion of a database execution engine 150. In some aspects, the database execution engine can be configured to provide query optimization of the query plan and select other execution engines to handle certain queries.

As illustrated, the method 700 can begin at operational block 710, where the computing apparatus 600, for example, can receive a query from an application. In some implementations, the query is received from an application separate from the database execution engine.

The method 700 can proceed to operational block 720, where the computing apparatus 600, for example, can identify a plurality of operators for executing the query. In some implementations, the computing apparatus 600, for example, can generate a query plan for executing the query.

The method 700 can proceed to operational block 730, where the computing apparatus 600, for example, can allocate a portion of a heap memory for execution of a pipeline comprising a first operator and a second operator. In some implementations, the second operator occurs after the first operator in a query plan. In some implementations, at least a portion of the plurality of operators are split among a plurality of pipelines including a first pipeline and a second pipeline, the plurality of pipelines are executed in a determined order to generate results responsive to the query, and/or executing the first pipeline comprises iteratively generating one or more blocks of data based upon operations contained within the first pipeline and storing the one or more blocks as intermediate results for the second pipeline.

The method 700 can proceed to operational block 740, where the computing apparatus 600, for example, can provide a first space in the allocated portion for storing first results of a first operator of a query. In some aspects, the first results can comprise a data table. In some aspects, the first space can be provided/allocated based on a number of columns required to store at least one row of the first results.

The method 700 can proceed to operational block 750, where the computing apparatus 600, for example, can generate at least a portion of the first results based on executing the first operator. In some implementations, the method 700 can additionally or alternatively include storing the first results in the first space and/or providing the first results for the second operator. In some aspects, providing the first results for the second operator can include providing access to the first space.

The method 700 can proceed to operational block 760, where the computing apparatus 600, for example, can provide a descriptor comprising information regarding the first space to the second operator. In some implementations, the descriptor can include one or more of an indication of a starting location of the first space, an indication of an ending location of the first space, a number of columns within the first space, a data type associated with each of the columns in the space, and/or a number of rows within the space.

The method 700 can proceed to operational block 770, where the computing apparatus 600, for example, can provide a second space in memory for storing second results of the second operator of the query. In some aspects, the second results can comprise a data table. In some aspects, the second space can be provided/allocated based on a number of columns required to store at least one row of the second results.

The method 700 can proceed to operational block 780, where the computing apparatus 600, for example, can generate at least a portion of the second results based on executing the second operator using the first results.

In some implementations, the method 700 can additionally or alternatively include generating at least a second portion of the first results based on executing the first operator, and/or storing, within the first space, the second portion of the first results. This second portion can be generated and/or stored in a second execution of the first operator, such as when control returns to the first operator after execution of the second operator (and/or other subsequent operators). In some implementations, the first results can be removed from the memory after the second operator finishes generation of the second results.

In this way, the database execution engine 150 can perform complex operations which share information necessary for and/or produced by execution of a query, while also pipelining execution.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in any high-level programming language (e.g., following procedural and/or object-oriented programming language paradigms), and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

The illustrated methods are exemplary only. Although the methods are illustrated as having a specific operational flow, the order of the operations may be altered, two or more operations may be combined into a single operation, a single operation may be performed in two or more separate operations, one or more of the illustrated operations may not be present in various implementations, and/or additional operations which are not illustrated may be part of the methods.

What is claimed is:

1. A system comprising:
   at least one data processor; and
   at least one memory storing instructions which, when executed by the at least one data processor, result in operations comprising:
      producing, by a query optimizer at a database execution engine, an optimized query plan based on a plurality of query execution cost estimates, wherein each query execution cost estimate is obtained from one of a plurality of execution interfaces included at the database execution engine;
      selecting, by the database execution engine and based on the optimized query plan, a query execution engine from among a plurality of query execution engines, wherein each of the plurality of execution interfaces is associated with one of the plurality of query execution engines;
      providing, by the database execution engine and to the selected query execution engine using the associated execution interface, the optimized query plan;
      providing, by the selected query execution engine and based on the optimized query plan, a first space in memory for storing first results of a first operator of the optimized query plan, wherein the first space is located within a previously allocated portion of a heap memory, and wherein the first space is allocated based on a number of columns required to store at least one row of the first results;
      generating, by the selected query execution engine and in response to the providing the first space, at least a portion of the first results based on executing the first operator, wherein at least the portion of the first results is stored in the first space;
      transferring, by the selected query execution engine, a control of the first space from the first operator and to a second operator, wherein the transferring the control of the first space comprises providing, by the selected query execution engine, a descriptor comprising information regarding the first space to the second operator, and wherein the first operator precedes the second operator in the optimized query plan;
      providing, by the selected query execution engine and in response to the transferring the control of the first space to the second operator, a second space in the previously allocated portion for storing second results of the second operator;
      generating, by the selected query execution engine and in response to providing the second space, at least a portion of the second results based on executing the second operator using at least the portion of the first results;
      restoring, by the selected query execution engine and in response to determining that the second operator has completed using at least the portion of the first results, the control of the first space from the second operator and to the first operator; and
      deallocating, by the selected query execution engine, the first space in response to the restoring the control of the first space to the first operator, in response to determining that the first operator has completed generating the first results, and in response to determining that the second operator is finished generating the second results based on the first results.

2. The system of claim 1, wherein the descriptor comprises one or more of an indication of a starting location of the first space, an indication of an ending location of the first space, a number of columns within the first space, a data type associated with each of the columns in the first space, and a number of rows within the first space.

3. The system of claim 1, wherein the operations further comprise:
   allocating, by the selected query execution engine, the previously allocated portion of the heap memory for execution of a pipeline comprising the first operator and the second operator.

4. The system of claim 1, wherein the operations further comprise:
   identifying, by the database execution engine, a plurality of operators for executing a query, the plurality of operators including the first operator and the second operator, wherein at least a portion of the plurality of operators are split among a plurality of pipelines including a first pipeline and a second pipeline, wherein the plurality of pipelines are executed in a determined order to generate results responsive to the query, and wherein executing the first pipeline comprises iteratively generating one or more blocks of data based upon operations contained within the first pipeline and storing the one or more blocks as intermediate results for the second pipeline.

5. The system of claim 1, wherein the operations further comprise:
  storing, by the selected query execution engine, the first results in the first space; and
  providing, by the selected query execution engine, the first results for the second operator, wherein providing the first results for the second operator comprises providing access to the first space.

6. The system of claim 5, wherein the first results are removed from the memory after the second operator finishes generation of the second results.

7. The system of claim 6, wherein the operations further comprise:
  generating, by the selected query execution engine, at least a second portion of the first results based on executing the first operator; and
  storing, within the first space, the second portion of the first results.

8. The system of claim 1, wherein the first results comprise a data table.

9. The system of claim 1, wherein the database execution engine is configured to select other query execution engines to handle certain queries.

10. The system of claim 1, wherein the optimized query plan is based on a query received from an application separate from the database execution engine.

11. A method comprising:
  producing, by a query optimizer at a database execution engine, an optimized query plan based on a plurality of query execution cost estimates, wherein each query execution cost estimate is obtained from one of a plurality of execution interfaces included at the database execution engine;
  selecting, by the database execution engine and based on the optimized query plan, a query execution engine from among a plurality of query execution engines, wherein each of the plurality of execution interfaces is associated with one of the plurality of query execution engines;
  providing, by the database execution engine and to the selected query execution engine using the associated execution interface, the optimized query plan;
  providing, by the selected query execution engine and based on the optimized query plan, a first space in memory for storing first results of a first operator of the optimized query plan, wherein the first space is located within a previously allocated portion of a heap memory, and wherein the first space is allocated based on a number of columns required to store at least one row of the first results;
  generating, by the selected query execution engine and in response to the providing the first space, at least a portion of the first results based on executing the first operator, wherein at least the portion of the first results is stored in the first space;
  transferring, by the selected query execution engine, a control of the first space from the first operator and to a second operator, wherein the transferring the control of the first space comprises providing, by the selected query execution engine, a descriptor comprising information regarding the first space to the second operator, and wherein the first operator precedes the second operator in the optimized query plan;
  providing, by the selected query execution engine and in response to the transferring the control of the first space to the second operator, a second space in the previously allocated portion for storing second results of the second operator;
  generating, by the selected query execution engine and in response to providing the second space, at least a portion of the second results based on executing the second operator using at least the portion of the first results;
  restoring, by the selected query execution engine and in response to determining that the second operator has completed using at least the portion of the first results, the control of the first space from the second operator and to the first operator; and
  deallocating, by the selected query execution engine, the first space in response to the restoring the control of the first space to the first operator, in response to determining that the first operator has completed generating the first results, and in response to determining that the second operator is finished generating the second results based on the first results.

12. The method of claim 11, wherein the descriptor comprises one or more of an indication of a starting location of the first space, an indication of an ending location of the first space, a number of columns within the first space, a data type associated with each of the columns in the first space, and a number of rows within the first space.

13. The method of claim 11, further comprising:
  allocating, by the selected query execution engine, the previously allocated portion of the heap memory for execution of a pipeline comprising the first operator and the second operator.

14. The method of claim 11, further comprising:
  identifying, by the database execution engine, a plurality of operators for executing a query, the plurality of operators including the first operator and the second operator,
  wherein at least a portion of the plurality of operators are split among a plurality of pipelines including a first pipeline and a second pipeline, wherein the plurality of pipelines are executed in a determined order to generate results responsive to the query, and wherein executing the first pipeline comprises iteratively generating one or more blocks of data based upon operations contained within the first pipeline and storing the one or more blocks as intermediate results for the second pipeline.

15. The method of claim 11, further comprising:
  storing, by the selected query execution engine, the first results in the first space;
  providing, by the selected query execution engine, the first results for the second operator, wherein providing the first results for the second operator comprises providing access to the first space, wherein the first results are removed from the memory after the second operator finishes generation of the second results.

16. A non-transitory computer-readable medium storing instructions which, when executed by at least one data processor, causes operations comprising:
  producing, by a query optimizer at a database execution engine, an optimized query plan based on a plurality of query execution cost estimates, wherein each query execution cost estimate is obtained from one of a plurality of execution interfaces included at the database execution engine;
  selecting, by the database execution engine and based on the optimized query plan, a query execution engine from among a plurality of query execution engines, wherein each of the plurality of execution interfaces is associated with one of the plurality of query execution engines;

providing, by the database execution engine and to the selected query execution engine using the associated execution interface, the optimized query plan;

providing, by the selected query execution engine and based on the optimized query plan, a first space in memory for storing first results of a first operator of the optimized query plan, wherein the first space is located within a previously allocated portion of a heap memory, and wherein the first space is allocated based on a number of columns required to store at least one row of the first results;

generating, by the selected query execution engine and in response to the providing the first space, at least a portion of the first results based on executing the first operator, wherein at least the portion of the first results is stored in the first space;

transferring, by the selected query execution engine, a control of the first space from the first operator and to a second operator, wherein the transferring the control of the first space comprises providing, by the selected query execution engine, a descriptor comprising information regarding the first space to the second operator, and wherein the first operator precedes the second operator in the optimized query plan;

providing, by the selected query execution engine and in response to the transferring the control of the first space to the second operator, a second space in the previously allocated portion for storing second results of the second operator;

generating, by the selected query execution engine and in response to providing the second space, at least a portion of the second results based on executing the second operator using at least the portion of the first results;

restoring, by the selected query execution engine and in response to determining that the second operator has completed using at least the portion of the first results, the control of the first space from the second operator and to the first operator, and deallocating, by the selected query execution engine, the first space in response to the restoring the control of the first space to the first operator, in response to determining that the first operator has completed generating the first results, and in response to determining that the second operator is finished generating the second results based on the first results.

17. The non-transitory computer-readable medium of claim 16, wherein the descriptor comprises one or more of an indication of a starting location of the first space, an indication of an ending location of the first space, a number of columns within the first space, a data type associated with each of the columns in the first space, and a number of rows within the first space.

18. The non-transitory computer-readable medium of claim 16, wherein the operations further comprise:

allocating, by the selected query execution engine, the previously allocated portion of the heap memory for execution of a pipeline comprising the first operator and the second operator.

19. The non-transitory computer-readable medium of claim 16, wherein the operations further comprise:

identifying, by the database execution engine, a plurality of operators for executing a query, the plurality of operators including the first operator and the second operator, wherein at least a portion of the plurality of operators are split among a plurality of pipelines including a first pipeline and a second pipeline, wherein the plurality of pipelines are executed in a determined order to generate results responsive to the query, and wherein executing the first pipeline comprises iteratively generating one or more blocks of data based upon operations contained within the first pipeline and storing the one or more blocks as intermediate results for the second pipeline.

20. The non-transitory computer-readable medium of claim 16, wherein the operations further comprise:

storing, by the selected query execution engine, the first results in the first space;

providing, by the selected query execution engine, the first results for the second operator, wherein providing the first results for the second operator comprises providing access to the first space, wherein the first results are removed from the memory after the second operator finishes generation of the second results.

* * * * *